United States Patent [19]
Pillet et al.

[11] Patent Number: 5,369,693
[45] Date of Patent: Nov. 29, 1994

[54] TELEPHONIC TELEMEETING SYSTEM

[75] Inventors: Michel Pillet, Brest; Daniel Piriou, Plouzane, both of France

[73] Assignee: France Telecom, France

[21] Appl. No.: 879,240

[22] Filed: May 6, 1992

[30] Foreign Application Priority Data

May 21, 1991 [FR] France .................. 91 06108

[51] Int. Cl.$^5$ ............................................ H04M 3/42
[52] U.S. Cl. .................................. 379/203; 379/204
[58] Field of Search .............. 379/201, 202, 203, 204, 379/205; 340/815.12; 370/62

[56] References Cited

U.S. PATENT DOCUMENTS

| | | | |
|---|---|---|---|
| 4,140,882 | 2/1979 | Regan et al. | 379/201 |
| 4,691,347 | 9/1987 | Stanley et al. | 379/204 |
| 4,894,859 | 1/1990 | Sou et al. | 379/204 |
| 4,939,773 | 7/1990 | Katz | 379/204 |
| 4,964,157 | 10/1990 | Aoshima | 379/204 |

FOREIGN PATENT DOCUMENTS

2592541  7/1987  France .

Primary Examiner—James L. Dwyer
Assistant Examiner—Harry S. Hong
Attorney, Agent, or Firm—Laubscher & Laubscher

[57] ABSTRACT

A telemeeting system comprises a terminal connected to the telephone network by telephone lines attributed to participant telephone sets. A console connected to the telephone set of one of the participants acting as organizer assists the latter in reflecting remarkable operations carried out by the terminal. These operations are indicated in a display board of indicator lights on the console and can be the result of commands transmitted by the organizer telephone set, such as a calling of a participant, inaccessibility of a line or the programming of a terminal operating mode, and of signallings such as the seizing or releasing of a line by a participant. The system also permits transmission of indications from each of the participants to the organizer, even if the participant does not have the right to speak, consultation of call number lists and time intervals of telemeetings in the terminal from the organizer, and automatic setting-up of participant calls for a telemeeting from the terminal.

16 Claims, 3 Drawing Sheets

TELEPHONIC TELEMEETING SYSTEM

BACKGROUND OF THE INVENTION

1. Field of the Invention

This invention relates to a telephonic telemeeting system connectable to the telephone network, whether public or private, in order to simultaneously link up several telephone sets of participants and thus establish an audioconference.

2 Description of the Prior Art

The telemeeting system comprises a terminal connected to the telephone network via plural terminal telephone lines equal in number to the maximum number of participants at a telemeeting. Each of the participants is provided with a telephone set which is associated with multifrequency-code signal generating means and which is selectively serviced by one of the terminal lines through the telephone network. One of the terminal telephone lines is attributed to an organizer of the telemeeting. This organizer monitors the telemeeting via the terminal mainly in order to call the participants, to receive calls from the participants, to select the participants whose speech is to be broadcast to the other participants, to restore the broadcasting of speech to participants who are only listening in, and to remove participants from the telemeeting.

A terminal for such a telemeeting system is disclosed in French patent application No. 2,592,541. This terminal comprises plural communication setting-up and cutting-off means respectively servicing the terminal lines for seizing the terminal lines and calling the participants under the control of the organizer set and for answering calls from the participant sets and transmitting said participant calls to the organizer set, switching and broadcasting means connected to the plural communication setting-up and cutting-off means for selectively broadcasting, under the control of the organizer set, voice signals coming from at least one of the participant sets to the other participant sets during the telemeeting, a multifrequency-code detector connected to one of the plural communication setting-up and cutting-off means servicing the organizer terminal line for decoding encoded control signals transmitted from the organizer set into decoded control signals, and a control circuit for setting-up and cutting-off communications between the participants and the organizer via the communication setting-up and cutting-off means and for selecting at least one of the participant sets whose voice signals are to be broadcast to the other telephone sets as a function of the decoded command signals.

In this telemeeting system, all of the above-mentioned operations commanded in the terminal by the organizer are not confirmed to the organizer. When an operation is decided by the organizer, the organizer is unaware of whether or not the operation has been performed by the terminal; in the event of defective working of the terminal, the organizer cannot attribute the operation failure to the terminal or to a wrong command. Furthermore, particularly when there is a large number of participants and when the operations to be performed during the telemeeting are numerous, it is difficult for the organizer to remember the exact condition of the various line connections and disconnections and the line and speech attributions to the participants in the terminal.

OBJECT OF THE INVENTION

The main object of this invention is to obviate the preceding disadvantages according to the prior art, particularly to provide the organizer with assistance for the running of the telemeeting in the form of information indicating the essential operations performed by the terminal.

SUMMARY OF THE INVENTION

Accordingly, in a telemeeting system of the above-defined type, the terminal comprises a multifrequency-code transmitter connected to one communication setting-up and cutting-off means servicing the organizer terminal line for encoding signalling signals derived by the control circuit, thereby transmitting encoded signalling signals to the organizer telephone set, and there is provided a console for the organizer that includes multifrequency-code reception means connectable to a subscriber telephone line servicing the organizer set for detecting seizings and releasings of the subscriber line and for decoding the encoded command signals and the encoded signalling signals, displaying means, and controlling means for controlling the display of information in the displaying means in response, respectively, to the command and signalling signals decoded in the reception means.

In this way, the console enables visualization of any remarkable event occurring in the terminal such as connections and disconnections of participants at the meeting, and the numbers of the free and busy telephone lines of the terminal associated with the names of the participants. The organizer can also visualize the current programming of the terminal. The displaying means in the console thus permanently reflects the exact configuration of the distant terminal. In particular, the multifrequency-code transmitter included in the terminal authorizes transmission of all events not commanded by the organizer set, such as e.g. the seizing or releasing of a terminal line by a participant.

A further object of this invention is to provide all participants at the telemeeting with the possibility of transmitting an indication to the organizer, irrespective of whether or not the participant is entitled to speak, i.e., independently of the broadcasting of the participant voice signals to the other participants. The indication can be an intervention request from an intervening participant in order that the organizer allow him to speak, or a particular information selected from among others to be transmitted by each of the participants in response to an organizer request.

The terminal then comprises, in addition, plural multifrequency-code detectors respectively connected to the communication setting-up and cutting-off means for decoding indication signals derived and transmitted by participant sets, including sets whose participants are only listening in and do not have the right to speak under the control of the organizer set. The control circuit retransmits the indication signals via the transmitter to the organizer telephone set, whereby the displaying means in the console displays indications carried by the indication signals retransmitted by the control circuit.

According to other features of the system embodying the invention, the system permits consultation of call number lists and time intervals of telemeetings in the terminal from the organizer, and automatic setting-up of participant calls for a telemeeting from the terminal.

BRIEF DESCRIPTION OF THE DRAWINGS

Further features and advantages of the invention will be apparent from the following particular description of several preferred embodiments of the invention as illustrated in the corresponding accompanying drawings in which.

DESCRIPTION OF THE PREFERRED EMBODIMENTS

Figure 1:
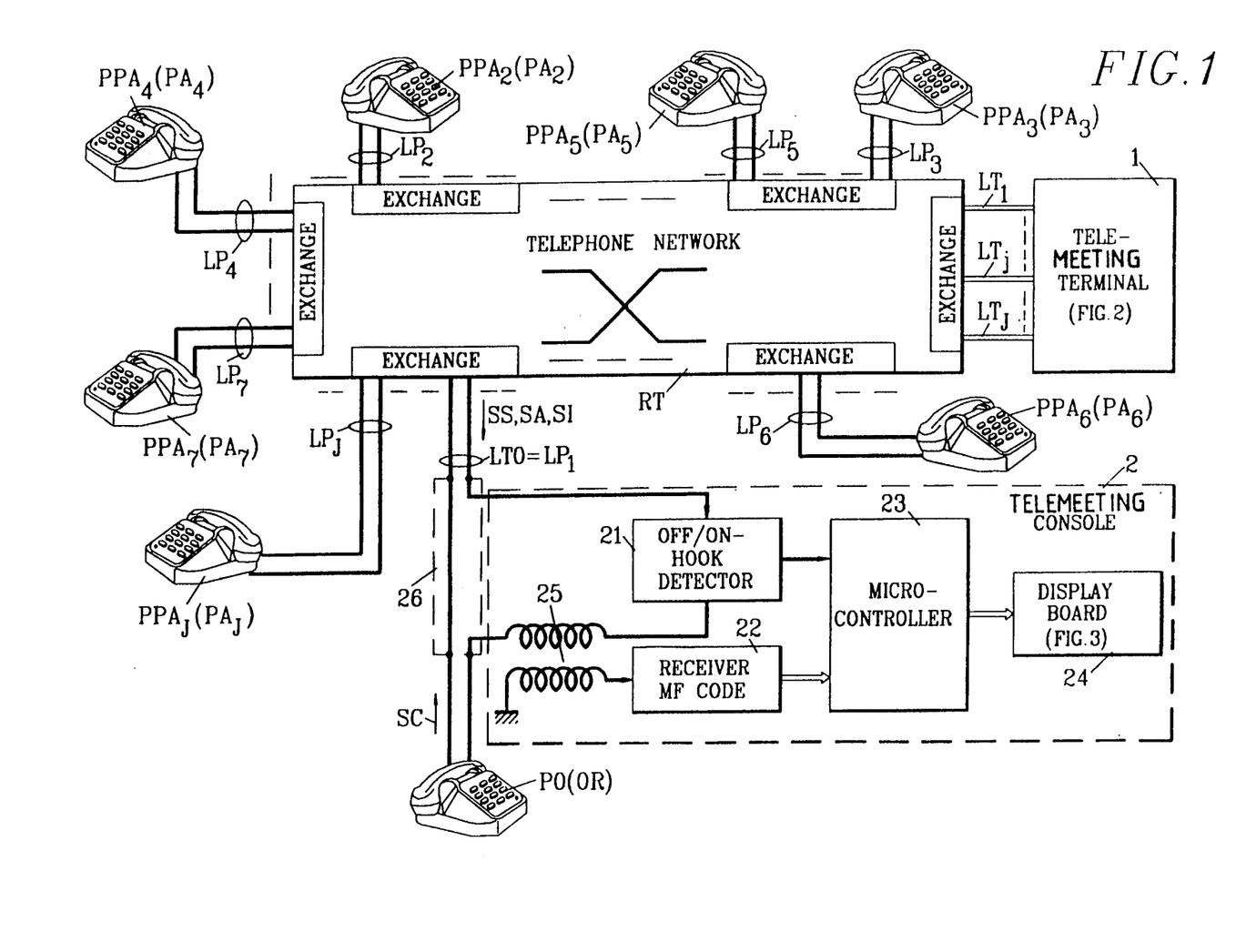
FIG. 1 is a schematic block diagram of a telephonic telemeeting system embodying the invention.

In reference to FIG. 1, a telephonic telemeeting system essentially comprises a telemeeting terminal 1 and a telemeeting console 2.

It is presupposed hereinafter that J terminal telephone lines $LT_1$ to $LT_J$ service the terminal 1 from a local automatic exchange of the public telephone network RT, J being an integer greater than 3 and less than or equal to 8 according to the embodiment shown in FIG. 1. Therefore the meeting may be attended by a maximum of J participants $PA_1$ to $PA_J$, inclusive of the telemeeting organizer OR. It should be noted that the term "participant" refers either to a person, or to a group of persons, the persons in the group being in relationship through another telemeeting system; in the latter case, the telemeeting thus constituted is referred to as a multimeeting (telemeeting of plural telemeetings).

The telemeeting console 2 is situated near a telephone set PO on the premises of the organizer of the telemeeting. The console 2 is interconnected to one of the wires of the telephone subscriber line LTO servicing the organizer set PO via a conventional removable telephonic contactor 26. As the set PO connected to the telephone network RT, the telephone sets $PPA_2$ to $PPA_J$ of the different participants $PA_2$ to $PA_J$ situated in distant places within the country or abroad, are connected to the network RT by respective subscriber telephone lines $LP_2$ to $LP_J$. The participant telephone sets, including that of the organizer, are conventional sets fitted with keyboard and including a (MF)multifrequency-code signal generator, or coupled to such a generator included e.g. in a hand calculator.

The telemeeting terminal 1 mainly manages connections and disconnections and exchanges of coded signals between the organizer telephone installation comprising the set PO and the console 2 and the participant telephone sets when a meeting is set up, during the telemeeting set up, and upon breaking up of the telemeeting.

Figure 2:
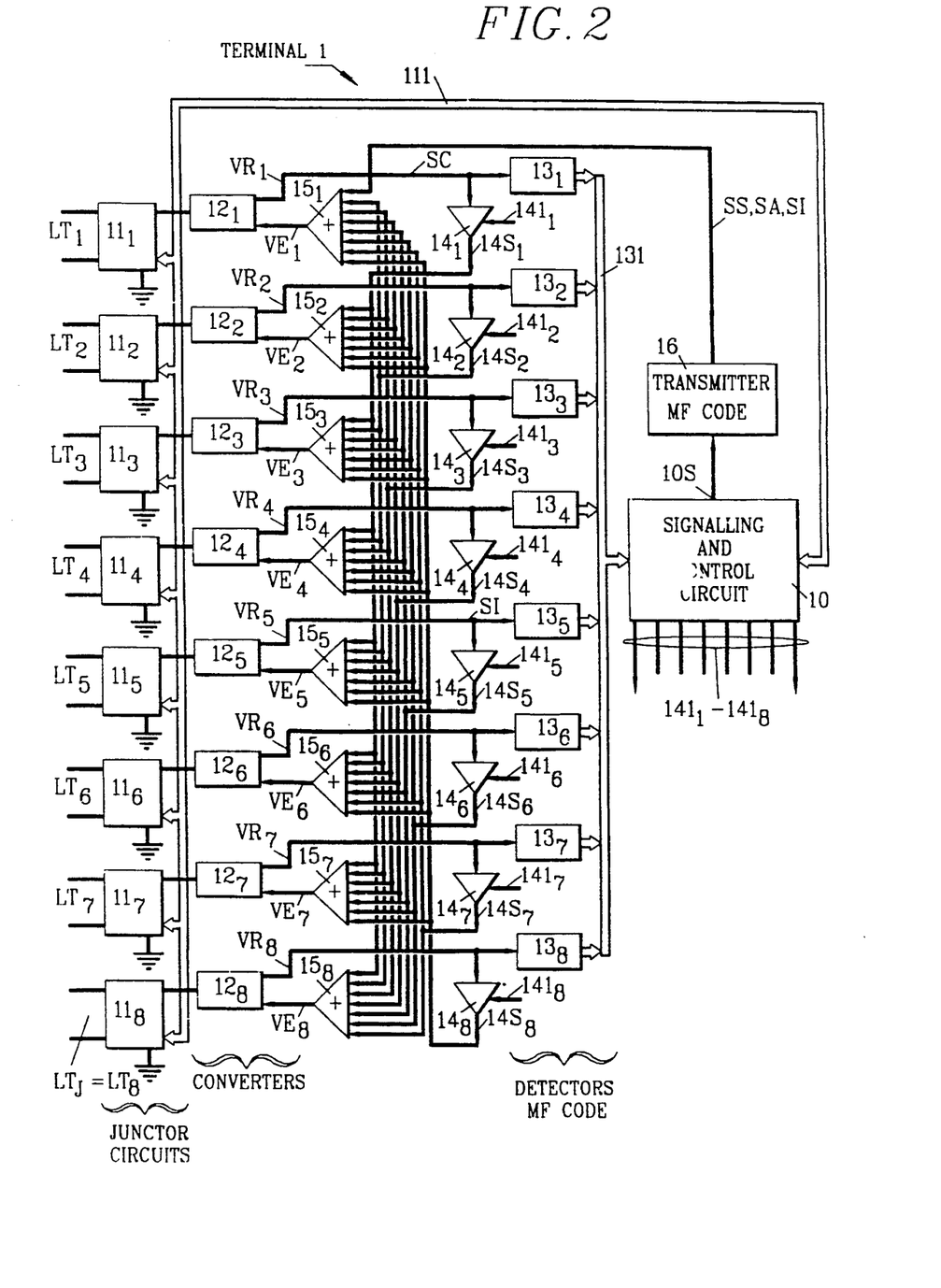
FIG. 2 is a block diagram of a telemeeting terminal embodying the invention.

As shown in FIG. 2, the telemeeting terminal 1 comprises various functional means substantially analogous to those described in French patent application No. 2,592,541. The terminal 1 essentially comprises a signalling and control circuit 10 in the form of a microprocessor, as well as sets of circuits $11_1$–$15_1$ to $11_8$–$15_8$ respectively associated with J=8 terminal telephone lines $LT_1$ to $LT_8$ servicing the terminal 1. Each set of circuits, e.g. the set associated with terminal line $LT_j$, where j is an integer lying between 1 and J=8, comprises a line junctor circuit $11_j$, a 2-to-4 wire converter $12_j$, a multifrequency-code detector $13_j$, an analog switch $14_j$, and an amplifier-adder $15_j$.

It is presupposed hereinafter that the terminal line $LT_1$ is attributable to the organizer OR of the telemeeting.

The junctor circuit $11_j$ is interconnected between the two-wire telephone line $LT_j$ and the converter $12_j$. The junctor circuit notably ensures separation of the voice signals and the multifrequency-code signals detectable by the detector $13_j$, with regard to the remote supply current in the line $LT_j$, detects various telephone tones, simulates an off-hooking operation in response to a ringing tone when line $LT_j$ is called by a participant or in response to a call to a participant from the organizer via line $LT_1$, simulates an on-hooking operation when the communication is broken off by the participant or the organizer and authorizes the transmission of coded dialling signals when a participant calls. These various communication setting-up and breaking-off operations specific to a participant PA via the line $LT_j$ are managed by the control circuit 10 via a bus $11_1$.

The converter $12_j$ converts the two-wire bidirectional path constituted by the telephone line $LT_j$ via the junctor circuit $11_j$, into a two-wire one-way reception path $VR_j$ connected to the inputs of the detector $13_j$ and switch $14_j$, and a two-wire one-way transmission path $VE_j$ connected to the output of the adder $15_j$. The converter also filters voice and multifrequency-code signalling signals, e.g. in a voice frequency band lying between 300 and 3400 Hz.

The multifrequency-code detector $13_j$ detects signals in multifrequency code transmitted by the telephone set with the conventional keyboard having at least 10+2=12 keys used by the participant having seized the terminal line $LT_j$. The multifrequency generator contained in the set associates, as is known, a couple of one of four low nominal frequencies and one of three high nominal frequencies with each key of the keyboard as per the following table I:

TABLE I

| Low frequency | Keys | | |
|---|---|---|---|
| 697 Hz | 1 | 2 | 3 |
| 770 Hz | 4 | 5 | 6 |
| 852 Hz | 7 | 8 | 9 |
| 941 Hz | * | 0 | # |
| High frequency | 1,209 Hz | 1,336 Hz | 1,477 Hz |

The detector $13_j$ converts the multifrequency-code signals received into binary-code signals supplied to the control circuit 10 via a bus $13_1$. These signals can e.g. result from the attribution of one of the J-1 terminal lines $LT_2$ to $LT_8$ to a participant and from the dialling of the participant telephone number by the organizer, the corresponding signals being detected by detector $13_1$, or can result from commands issued by the organizer's telephone keyboard or from indications coming from participant sets to the console 2 during the telemeeting, as specified hereinunder.

The analog switch $14_j$ has an output $14S_j$ which is connected to respective one of the J-1=7 inputs of each of the J-1 adders $15_1$ to $15_8$ other than the adder $15_j$ in order to retransmit the voice signals received in the path $VR_j$ to the transmission paths $VE_1$ to $VE_8$ other than the path $VE_j$ when the switch $14_j$ is closed. The closings and openings of the switch are triggered by respective states "1" and "0" in an output wire $141_j$ of the control circuit 10. For instance, the switch $14_j$ is closed when the circuit 10 allocates speech to the participant $PA_j$ corresponding to the terminal line $LT_j$ during the telemeeting, or when the circuit 10 returns speech to all the participants.

The adder $15_j$ comprises J-1=7 inputs, respectively, connected to the outputs of the switches $14_1$ to $14_J$ other than the switch $14_j$ and adds up the signals going through whichever of the switches are closed in order to retransmit them globally in the transmission path $VE_j$ to the input of the converter $12_j$. In this manner, when all the switches are closed, each signal in a path $VR_j$ is broadcast in all the transmission paths $VE_1$ to $VE_J$ other than the path $VE_j$ and therefore to all the other participants.

As also shown in FIG. 2, the adder $15_1$ assigned to the organizer OR comprises according to the invention an additional input connected to a signalling output 10S of the control circuit 10 via a multifrequency-code transmitter 16. Signalling signals SS supplied by the output 10S are derived by the control circuit 10 in order to signal preprogrammed operating modes of the terminal and remarkable events in relation to the telemeeting independently of any command derived by the organizer's telephone PO at the telemeeting console 2 in order to update a display panel of indicator lights included in the console. These signalling signals supplied in binary code by the circuit 10 are converted to a CCITT three-character multifrequency code Q23 by the transmitter 16 for transmission in the line $LT_1$ via the adder $15_1$ and the transmission path $VE_1$.

The signalling signals SS concern on the one hand, telemeeting modes programmed in the programmable read-only memory PROM of the circuit 10, on the other hand, connections and disconnections of the participant lines. Each signalling signal is comprised of two identical characters A, B, C or D on either side of a figure corresponding to a frequency combination according to table I. The characters A, B, C and D correspond to the frequency combinations [697 Hz+1,633 Hz], [770 Hz+1,633 Hz], [852 Hz+1,633 Hz] and [941 Hz+1,633 Hz] of the CCITT code Q23 respectively. By comparison with the table I, it appears that these four combinations cannot be accessed by the keyboard of any telephone set, which enables the console 2 to distinguish first and second coded signals that are respectively control signals SC transmitted by the set PO and signalling signals SS transmitted by the terminal 1.

As an example, a first group of signalling signals SS comprises the following five sequences which are transmitted by the terminal 1 to the organizer set PO after reception of the terminal call number and the access code which are dialled by the organizer:

B0B signalling a complete freeing of the terminal 1 subsequent to all the participant set handsets being replaced, and the terminal being at rest;

B1B authorizing a "7+1" mode as well as an "additive" mode; the "7+1" mode signals that the line $LT_1$ is reserved solely for the telemeeting organizer, and that only he can have access to it, even during a telemeeting, by dialling a four-figure access code (a b c d) on the keyboard of the set PO; the "additive" mode signals that the participants can be called by the organizer, and a contrario, the "additive" mode is not authorized when the participants can only call terminal 1 themselves to establish communications ("rendez-vous" mode);

B2B authorizing the "7+1" mode and prohibiting the "additive" mode;

B3B authorizing the "8-person conference" mode (Conf. 8) and prohibiting the "additive" mode, which means that the organizer is deemed a participant and cannot call the participants.

The signalling signals of a second group are in the form of sequences CjC and DjD. A sequence CjC indicates a connection of line $LT_j$, with j different from 1, when the terminal line $LT_j$ is seized by a participant subsequent to the dialling of the call number of the line and to an off-hook simulation in the junctor circuit $11_j$. A sequence DjD indicates a disconnection of the line $LT_j$, with j different from 1, when this line is released by the participant or by an on-hook simulation in the junctor circuit $11_j$. The sequences C1C and D1D are useless since the off-hooking and on-hooking operations in the organizer's telephone set are detected directly in the subscriber line $LT_O$ by the console 2.

Again in reference to FIG. 1, the telemeeting console 2 essentially comprises, as in most telephone line surveillance devices that do not intervene in communications established on the line, an off-hook/on-hook detector 21, a multifrequency-code receiver 22, and a control microcontroller 23 controlling LED-type indicator lights in a display board 24.

The detector 21 is interconnected to one of the wires of the subscriber line LTO via the primary winding of a transformer 25 and signals to the microcontroller 23 any seizing of line seized subsequent to the handset of the telephone PO being picked up and any releasing of the line subsequent to replacing of the handset of the telephone PO, irrespective of the type of incoming or outgoing communication. The receiver 22 is connected to the secondary winding of the transformer 25 and detects any multifrequency coded signal transmitted in the line in order to convert it into a binary word to be applied to the microcontroller. The input and the output of the detector 21 are connectable directly and via the primary winding of the transformer 25 to the telephone line LTO preferably by means of the removable telephone contactor 26.

The microcontroller 23 in the console 2 thus distinguishes first and second coded signals SC and SS which are respectively transmitted by a multifrequency generator commanded by the keys of the keyboard in the telephone PO and as per table I, and transmitted by the multifrequency transmitter 16 in the telemeeting terminal 1 and comprising notably characters A, B, C and D described hereinabove.

As an example, the first multifrequency-code signals SC derived by the organizer telephone PO are comprised of the following sequences divided into two groups, depending on whether the sequence is intended to preprogram the terminal 1 during the preparation of the telemeeting, or to command operations during a telemeeting:

1) Telemeeting terminal programming commands:
 ### "additive" mode prohibited,
 #*# "additive" mode authorized,
 #1# positioning in the "7+1" mode,
 *1* positioning in the "8-person conference" mode
 *#*abcd loading of the "organizer" access code abcd,
 *#*# suppression of any access codes to the terminal,
 *9# check of the number of additive seizings.

2) Operational commands during a telemeeting:
 *2* to *8* seizing in the "additive" mode of a line $LT_2$ to $LT_8$ if it was free, or allocation of speech to this line, the others being put into the "listening only" mode,

*9* check of the number of participants connected up,

*0* allocation of speech to all participants,

0* global unlocking of lines LT₂ to LT₈ ("rendez-vous" mode),

2* to #8* unlocking of one of lines LT₂ to LT₈ ("rendezvous" mode),

2# to #8# locking of the line LT₂ to LT₈ ("rendez-vous" mode) and releasing of this line,

*0#ij* allocation of speech to the participants PA$_i$ and PA$_j$ serviced by the lines LT$_i$ and LT$_j$, the others being put into the "listening only" mode,

*0#* suppression of the allocation of speech to all participants (divided-up discussion),

0# complete releasing of the telemeeting terminal,

**j* acknowledgement of information coming from participant PA$_j$ with broadcasting of a chime to the participant,

*** general broadcasting of a chime and suppression of the allocation of speech to all the participants (divided-up discussion).

The unlocking and locking operations on a terminal line LT$_j$ correspond to off-hook and on-hook preparation operations simulated by the junctor circuit 11$_j$ under the control of the controlling circuit 10, respectively when the organizer decides that the participant serviced by the line LT$_j$ should come into or be withdrawn from the telemeeting; these operations are performed in the "rendez-vous" mode subsequent to a call on line LT$_j$ by the participant PA$_j$.

In order to avoid any display in the console corresponding to a command signal SC received mistakenly in the terminal 1, the terminal 1 only transmits to the console 2, via the transmitter 16, a command acknowledgement signal SA after decoding of the signal SC by the detector 13₁ and execution of the operation corresponding to the command signal by the circuit 10. The acknowledgement signal corresponding to the character A (697 Hz+1,633 Hz) of the code Q23, only triggers a corresponding signalling in the console 2 if the acknowledgement signal SA is received at most after a predetermined period TA subsequent to the detecting of the command signal in the console. The predetermined period TA is less than one second, typically 300 ms. If the acknowledgement signal SA is not received during the period TA, the command signal derived by the telephone PO and recorded in the microcontroller 23 is destroyed and no display occurs on the board 24.

Figure 3:
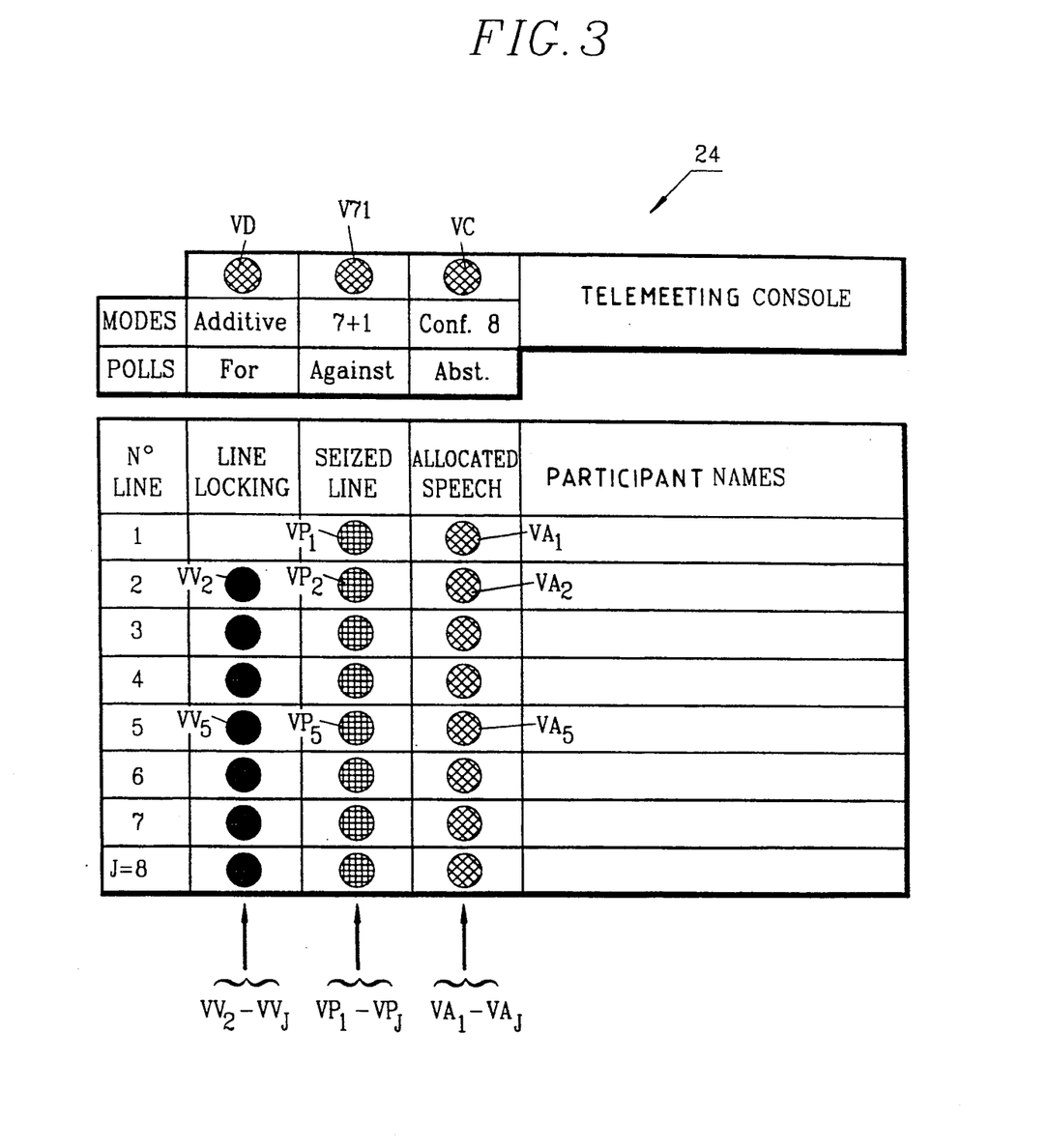
FIG. 3 shows a display board in a telemeeting console embodying the invention.

The console 2 is e.g. in the form of a small box of which the front side shows the display board 24. As shown in FIG. 3, the board 24 comprises a matrix with J=8 rows and five columns. The rows in the matrix are respectively attributed to the telephone lines LT₁ to LT₈ servicing the telemeeting terminal 1. The row relating to the line LT$_j$ bears the line number j in a first column, first, second and third LED-type indicator lights VV$_j$, VP$_j$ and VA$_j$ of different colors, e.g. red, yellow and green, in the following columns, and a frame in which the name of the participant PA$_j$ can be inscribed in the fifth column. Each row comprises three indicator lights, except preferably the first row attributed to the organizer OR, which only comprises two indicator lights VP₁ and VA₁.

When lighting, the first indicator light VV$_j$, with $2 \leq j \leq 8$, indicates that the terminal line LT$_j$ is locked to the "rendez-vous" mode subsequent to reception of the sequence signal #j#; none of the participants may have access to the telemeeting via the line LT$_j$. The indicator light VV$_j$ is deenergized in response to a signal with sequence #j* or possibly #0*, commanding the unlocking of the line LT$_j$.

The second indicator light VP$_j$, with $1 \leq j \leq 8$, is energized to designate that the terminal line LT$_j$ has been seized by the participant PA$_j$, in response to the signalling signal CjC. When the line LT$_j$ is released by the participant, the signalling signal DjD causes the indicator light VP$_j$ to extinguish.

The third indicator light VA$_j$ indicates, when lighting, that the participant corresponding to the terminal line LT$_j$, which the second indicator light signals as having been seized, is authorized to intervene, i.e., the speech signals in the reception path VR$_j$ are broadcast to the other participants via the switch 14$_j$ in the closed condition. The closing of the switch 14$_j$ and the lighting of the third indicator light VA$_j$ follow the command signal *j*, or possibly *0* or *0#ij*. When the indicator light VA$_j$ is extinguished and the switch 14$_j$ is therefore open, the participant PA$_j$ whose telephone PPA$_j$ is connected to the line LT$_j$, is in the "listening-only" mode and cannot intervene in the telemeeting; he may only receive speech signals from the participants authorized to speak, via the adder 15$_j$. The indicator light VA$_j$ is thus deenergized subsequent to a command signal *i*, or *0#ik*, where i and k are integers lying between 1 and J and different from j, or when the terminal line LT$_j$ is locked or is not seized and therefore the indicator light VV$_j$ is lighting or the indicator light VP$_j$ is extinguished.

The display board 24 also has another row of three indicator lights VD, V71 and VC for signalling the three operating modes of the telemeeting terminal 1.

The indicator light VD lights up in response to the command signal #*# confirmed by the acknowledgement signal SA, or in response to the signalling signal B1B or B3B. When the "additive" mode is prohibited subsequent to the detecting of the signals ### and SA, or the signal B2B or B4B, the indicator light VD is extinguished.

The indicator light V71 is energized in response to the command signal #1# confirmed by the signal SA, or in response to the signalling signal B1B or B2B, in order to signal that a meeting with seven or more participants can be undertaken, the line LT₁ being reserved for the organizer of the meeting. When the indicator light V71 is extinguished, this means that the terminal line LT$_j$ is an ordinary telephone line, as are the other terminal lines LT₂ to LT$_J$, and is no longer reserved for the organizer.

The last mode indicator light VC is energized to indicate the "J=8-person conference" mode in which the line LT₁ can be called by any participant. The lighting of the indicator light VC is triggered in response to the command signal *1* confirmed by the acknowledgement signal SA, or in response to the signalling signal B3B or B4B. The indicator light VC is extinguished when the indicator light V71 is lighting, as the indicator lights V71 and VC can never light up simultaneously.

The various indicator lights included in the display board 24 may be LED diodes, or electro-optical crystal bars.

In the coded signal operations and processings described hereinabove, only the multifrequency-code signal detector 13₁ attributable to the organizer OR of the telemeeting intervenes in the terminal 1. "Commands" from the participant telephone sets $PPA_2$ to $PPA_J$ relating to callings (rendez-vous mode) and freeings of the telephone lines $LT_2$ to $LT_J$ are detected by means of the junctor circuits $11_2$ to $11_J$.

The purpose of the detectors $13_2$ to $13_J$ with regard to "indications" from participants' telephones will now be explained. These indications are mainly of two types, one relating to an intervention request from a participant, or from a group of participants in the case of a multimeeting, the other relating to information requested to a participant by the organizer.

It is presupposed that during a meeting, the speech signal transmitted by the participant $PA_2$, or by the group of participants $PA_2$ debating internally, is only broadcast to the other participant telephones $PPA_1=PO$ and $PPA_3$ to $PPA_J$. The analog switches $14_1$ and $14_3$ to $14_J$ are open, and only the switch $14_2$ is in the closed condition in order for the adders $15_1$ and $15_3$ to $15_J$ to broadcast the speech signal of the participant $PA_2$ to the telephones PO and $PPA_3$ to $PPA_J$. These conditions of the switches $14_1$ to $14_J$ result from a command signal *2* transmitted by the organizer telephone PO and detected by the detector $13_1$, and from the activation of the wire $141_2$ at the "1" state and the de-activation of the wires $141_1$ and $141_3$ to $141_J$ at the "0" state by the control circuit 10. The participants $PA_1=PO$ and $PA_3$ to $PA_J$ are therefore merely "listening-only" participants. The indicator light $VA_2$ is in lighted condition.

Then, one of the other participants, e.g. participant $PA_5$, wishes to intervene while participant $PA_2$ is speaking. The intervening participant $PA_5$ presses key No. 5 on the keyboard of his telephone $PPA_5$, corresponding to the number of the terminal line $LT_5$ attributed to this participant. A coded indication signal SI [770 Hz+1,336 Hz] corresponding to key No. 5 is decoded in the detector $13_5$ into a binary word applied to the controlling circuit 10. The latter compares the binary word with a coded binary number corresponding to the line $LT_5$ read in the read-only memory, and enables the intervention request from participant $PA_5$ if the key number and line number correspond. This enabling is translated into the transmission of multifrequency-code figure No. 5 from the transmitter 16 via the adder $15_1$. The receiver 22 in the console 2 decodes figure No. 5, and the microcontroller 23 commands the flashing of the indicator lights $VV_5$, $VP_5$ and $VA_5$, or of at least one of them according to another embodiment, placed in row No. 5 of the board 24. The organizer OR is thus informed of the intervention request from the participant $PA_5$.

It should be noted that with the console 2 embodying the invention, the organizer is incapable of identifying any intervention request from a participant or group of participants not speaking. This possibility of participant number detection and participant identification independently of the right to speak is important in the case of a multimeeting where the number J of participants is high, in the region of several tens of participants, and where it cannot be envisaged to allow all the participants to speak.

Further to the intervention request from the identified intervening participant $PA_5$, the organizer OR services this request according to one of two possibilities, immediately or at a later stage so as not to interrupt what participant $PA_2$ is saying.

According to a first possibility, the organizer dials on the keyboard of the telephone PO the command sequence *5* which is detected and decoded in the detector $13_1$ of the terminal 1 and the receiver 22 of the console 2. The control circuit 10 simultaneously activates the wire $141_5$ in the state "1" to close the switch $14_5$ and de-activate the wire $141_2$ in the state "0" to open the switch $14_2$, the other switches $14_1$, $14_3$, $14_4$, and $14_6$ to $14_J$ remained open. The participant, or group of participants, $PA_5$, can now speak and his speech is broadcast to the other participants $PA_1$ to $PA_4$ and $PA_6$ to $PA_J$. The control circuit 10 also transmits the acknowledgement signal PA to the console 2 via the transmitter 16 in order for the microcontroller 23 to extinguish the indicator light $VA_2$, stop the flashing of the indicator lights $VV_5$, $VP_5$ and $VA_5$, and command the lighting of the allocated speech indicator light $VA_5$.

According to another possibility, the organizer OR decides to dial the command sequence *0#25* for the two participants $PA_2$ and $PA_5$ to be able to talk and for their conversation to be listened to by the other participants. The corresponding command signal *0#25* is detected in the detector $13_1$ and the receiver 22. The control circuit 10 only modifies the state of the wire $141_5$ to activate, and to close the switch $14_5$, the switch $14_2$ being held closed. The debate between the participants $PA_2$ and $PA_5$ is thus broadcast to the other participants, and the participants $PA_2$ and $PA_5$ receive the speech signals coming from participants $PA_5$ and $PA_2$ respectively. The control circuit 10 transmits, via the transmitter 16, the acknowledgement signal SA which, received via the receiver 22 by the console microcontroller 23, stops the flashing of the indicator lights $VV_5$, $VP_5$ and $VA_5$ and only commands the lighting of the indicator light $VA_5$, indicator light $VA_2$ remaining lighted.

Information request from the organizer OR and information transmission to the organizer OR are described hereinunder. This type of operation is selected when the groups of participants are to be put in "divided-up discussion", i.e. the internal debates of groups are not to be broadcast, though the organizer can detect any intervention request or collect results of a poll by each group without the other groups having cognizance of the internal debate or poll of said group.

Beforehand, the organizer asks each group of participants $PA_j$ to transmit his attribution figure j followed by the information requested. This information is e.g. the result of a poll by the group in the form of one of the three replies "FOR", "AGAINST" and "ABSTENTION" to a question put forward. The three replies are respectively associated with the indicator lights VD, V71 and VC as shown in FIG.3.

The organizer OR dials the command sequence *0#*, or the sequence ***, on the keyboard of the telephone PO which is detected and decoded in the detector $13_1$ and the receiver 22. The control circuit 10 de-activates all the wires $141_1$ to $141_J$ which change into the state "0", thereby opening all the switches $14_1$ to $14_J$. No speech signal is transmitted through all of the transmission paths $VE_1$ to $VE_J$, and all of the groups of participants are then acoustically isolated from one another. Conversely, any coded indication signal SI transmitted from one of the telephones $PPA_1$ to $PPA_J$ can be detected in the terminal 1 and retransmitted to the console 2. The acknowledgement signal SA transmitted by the terminal 1 in response to the sequence *0#* validates the latter in the console 2. All of the indicator lights VA$_1$ to VA$_J$ on the board 24 are then extinguished.

Each PA$_j$ of the participants or groups of participants then presses the key j followed by one of the keys 1, 2 or 3 on the keyboard of the telephone PPA$_j$. The indication signal j is decoded in the detector 13$_j$ and enabled in the control circuit 10. Subsequent to both this enabling and also the detecting of the poll FIG. 1, 2 or 3, the figure j and the poll figure are encoded and transmitted by the transmitter 16 and detected in the console receiver 22. The microcontroller 23 commands in the board 24 the flashing of the indicator lights VV$_j$, VP$_j$ and VA$_j$, or, as previously stated, the flashing of one of these indicator lights according to another embodiment, as well as one of the indicator lights VD, V71 and VC depending on whether the poll figure is 1, 2 or 3.

After noting the result of the poll by participant PA$_j$, the organizer acknowledges the latter by dialling the command sequence **j* which is detected by the detector 13$_1$. The control circuit 10 on the one hand commands the junctor circuit 11$_j$ in order to transmit a predetermined tone signal corresponding to a chime in the terminal line LT$_j$ in the direction of the telephone PPA$_j$, and on the other hand provokes the transmission of the acknowledgement signal SA in the organizer terminal line LT$_1$ in order for the microcontroller 23 to stop the flashing of the indicator lights VV$_j$, VP$_j$ and VA$_j$, and of one of the indicator lights VD, V71 and VC corresponding to the poll figure.

It should be noted that since the participants PA$_1$ to PA$_j$ can transmit the result of their poll quasi-simultaneously, the control circuit 10 memorizes these results in a buffer memory in order to retransmit them to the console 2 according to a predetermined order of priority, e.g. in increasing order of the FIGS. 1 to J. The results are transmitted progressively in response to acknowledgement signals **1* to **J* supplied by the telephone PO.

According to another embodiment, when the terminal 1 is programmed in the "7+1" mode, the organizer can abstain from polling. In this case, only the switch 14$_1$ is closed, thereby enabling the organizer to ask each participant for his polling result.

According to another embodiment, the telemeeting console 2 is substantially modified. A multifrequency-code transmitter is associated with the multifrequency-code receiver 22 and is connected between the secondary winding of transformer 25, which becomes a bidirectionnel hybrid coupler, and the microcontroller 23. The microcontroller 23 is fitted with a keyboard with function keys and figure keys, and an alphanumerical screen which may replace or add up to the display board 24.

The console according to this second embodiment offers the following additional functions, knowing that the signalling and control circuit 10 in terminal 1 is preprogrammed in correspondance with these functions.

Previously transmission of any predetermined sequence SP from the console to terminal 1, the console MF-transmitter transmits automatically a console identification sequence SIC, via subscriber line LTO, network RT and terminal line LT$_1$, which is detected in MF-detector 13$_1$ and recognized in control circuit 10. The identification sequence includes notably characters A, B, C and D that are not imitable in any conventional telephone set.

Following this identification sequence, the organizer OR dials one of the predetermined sequences SP by means of the console keyboard thereby transmitting it to the terminal. The sequences SP are divided into first and second sequences. The first sequences are command sequences SPC intended for commanding predetermined functions in the terminal. The second sequences are interrogation sequences SPI that cause reading of telemeeting parameters memorized in the control circuit 10. The read parameters are then transmitted in a form of encoded telemeeting parameter sequences SPT from transmitter 16 so that the console screen visualizes the read parameters. Sequences SPC, SPI and SPT are indicated as examples hereinafter.

Function keys on the keyboard of the console are used by the organizer OR to dial a participant repertory, and lists of participant names and call numbers respectively associated with telemeetings. This repertory and these lists are stored in the microcontroller 23 and can be read on the console screen, and are updated, or partly or entirely cancelled in memory of the microcontroller, by the organizer. A call number list for participants in a telemeeting is thus transmitted automatically from the microcontroller 23 through the console MF-transmitter whereby the control circuit 10 memorizes the call numbers in the list, and automatically dials, via junctor circuits 11$_1$ to 11$_3$, the call numbers in the list at the beginning of a time interval defining the duration of the telemeeting. The time interval is fixed by the organizer by means of the console keyboard and is also transmitted in a form of an encoded sequence SPC from the console to the terminal.

Terminal 1 thus manages the schedule of the telemeetings requested by the organizer OR, and more generally, by various telemeeting organizers, each having a telemeeting console. Sequences SPC, SPI, and SPT are thus exchanged between the terminal and the console whereby the organizer examines telemeeting parameters relating to telemeetings to be established by the terminal, and, where applicable, parameters relating to a telemeeting already established by the terminal. The organizer consults time intervals already reserved for telemeetings, reserves a time interval for each telemeeting transmits the call number list corresponding to this telemeeting, and cancels a time interval already reserved by himself. A console identifier corresponding to the sequence SIC, a list of call numbers and a list identifier are thus associated with each time interval.

Thanks to the alphanumerical screen of the console, the organizer is guided by displayed information stored in microcontroller 23 and terminal 1 to organize and supervise telemeetings. This information is e.g.:

speech activity duration for each terminal line LT$_1$ to LT$_j$ cumulated throughout a telemeeting;

telephone communication duration for each terminal line during a telemeeting, notably to invoice the telemeeting service;

the repertory of the participants including their names and call numbers;

the lists of stringed call numbers with the list identifiers;

the historical record of the latest telemeetings, e.g. last five telemeetings, organized by the orgainzer OR by means of console 2;

the free time intervals to allow notably, further the reservation a next telemeeting, the prolongation of a telemeeting in progress.

What we claim is:

1. A telephonic telemeeting system comprising a terminal connected to a telephone network via plural terminal telephone lines equal in number to a maximum number of participants at a telemeeting, each of said participants, including an organizer of said telemeeting, disposing of a telephone set which is connected to a subscriber telephone line and associated with multifrequency-code signal generating means and which is selectively serviced by one of said terminal telephone lines through said telephone network, one of said terminal telephone lines being attributed to said telemeeting organizer, said terminal comprising plural communication setting-up and cutting-off means respectively servicing said terminal telephone lines for seizing said terminal telephone lines and calling the participants under the control of said organizer telephone set and for answering calls from said participant telephone sets and transmitting said participant calls to said organizer telephone set, plural switching and broadcasting means connected to said plural communication setting-up and cutting-off means for selectively broadcasting, under the control of said organizer telephone set, voice signals coming from at least one of said participant telephone sets to the other participant telephone sets during said telemeeting, a multifrequency-code detector connected to one of said plural communication setting-up and cutting-off means servicing said organizer terminal telephone line for decoding encoded command signals transmitted from said organizer telephone set into decoded command signals, and a control circuit for setting-up and cutting-off communications between said participants and said organizer via said plural communication setting-up and cutting-off means and for selecting at least one of said participant telephone sets whose voice signals are to be broadcast to said other telephone sets, as a function of said decoded command signals, said terminal further comprising a multifrequency-code transmitter connected to said one communication setting-up and cutting-off means servicing said organizer terminal telephone line for encoding signalling signals derived by said control circuit thereby transmitting encoded signalling signals to said organizer telephone set and plural multifrequency-code detectors respectively connected to said plural communication setting-up and cutting-off means for decoding indication signals derived and transmitted by said participant telephone sets, including telephone sets whose participants are only listening in and do not have the right to speak under the control of the organizer telephone set during said telemeeting, said control circuit retransmitting said indication signals via said multifrequency-code transmitter to said organizer telephone set, and said system comprising a console for said organizer, said console including multifrequency-code reception means connectable to said subscriber telephone line servicing said organizer set for detecting seizings and releasings of said subscriber line and for decoding said encoded command signals transmitted from said organizer telephone set and said encoded signalling signals transmitted from said multifrequency-code transmitter through said telephone network, displaying means, and controlling means for controlling the display of information in said displaying means in response respectively to said encoded command signals and encoded signalling signals decoded in said reception means and the display of indications in said displaying means in response respectively to said indication signals retransmitted by said control circuit via said multifrequency-code transmitter.

2. The telemeeting system according to claim 1, wherein said control circuit in said terminal transmits an acknowledgement signal encoded by said transmitter in said organizer terminal line in response to each of said encoded command signals, and said controlling means in said console only controls the display of an information corresponding to said each of said command signals when said acknowledgement signal is decoded by said reception means.

3. The telemeeting system according to claim 1, wherein said display of information is not controlled when an acknowledgement signal is not decoded during a predetermined period following said decoding of one of said encoded command signals in said reception means.

4. The telemeeting system according to claim 1, wherein said encoded signalling signals derived by said control circuit carry at least one of the informations relating to operating modes of said terminal and to seizings and releasings of said terminal telephone lines.

5. The telemeeting system according to claim 1, wherein said displaying means comprises three indicator lights which are associated to each of said terminal telephone lines and which are respectively lighted in response to a command signal commanding an inaccessibility of said terminal via each of said terminal telephone lines, a signalling signal indicating the seizing of each of said terminal telephone lines by the associated participant, and a command signal commanding a broadcasting of voice signals at least from the set of said participant serviced by each of said terminal telephone lines to the other telephone sets.

6. The telemeeting system according to claim 1, wherein said displaying means comprises indicator lights that are lighted respectively in response to command signals which program operating modes in said terminal and to signalling signals which indicate operating modes preprogrammed in said terminal.

7. The telemeeting system according to claim 1, wherein said encoded signalling signals are comprised of frequency combinations other than frequency combinations generated by said multifrequency-code signal generating means included in said participant telephone sets.

8. The telemeeting system according to claim 1, wherein, in order to formulate an intervention request from an intervening participant at said telemeeting, the intervening participant telephone set transmits an encoded indication signal when pressing keyboard keys in said intervening participant telephone set corresponding to a number of the terminal telephone line through which said intervening participant is communicating, said displaying means in said console displays an identification of said terminal telephone line in response to the encoded indication signal retransmitted by said control circuit in said terminal, and said organizer telephone set transmits a predetermined command signal whereby said control circuit in said terminal controls at least a broadcasting of voice signals from the intervening participant to said other participant telephone sets.

9. The telemeeting system according to claim 8, wherein said displaying means comprises three indicator lights which are associated to each of said terminal telephone lines and which are respectively lighted in response to a command signal commanding an inaccessibility of said terminal via each of said terminal telephone lines, a signalling signal indicating the seizing of each of said terminal telephone lines by the associated participant, and a command signal commanding a broadcasting of voice signals at least from the set of said participant serviced by each of said terminal telephone lines to the other telephone sets, and said retransmitted encoded indication signal triggers in said displaying means the flashing of at least one of said indicator lights associated with said terminal telephone line through which said intervening participant is communicating.

10. The telemeeting system according to claim 8, wherein said terminal telephone line number carried by said encoded indication signal transmitted by said intervening participant telephone set is enabled by comparison with a line number memorized in said control circuit prior to retransmission of said encoded indication signal from said control circuit in said terminal to said console.

11. The telemeeting system according to claim 1, wherein in order to formulate an information transmission request intended for said participants, said organizer telephone set transmits a command signal for said control circuit to prohibit all broadcasting of voice signals from said switching and broadcasting means, each of said participant telephone sets transmits an encoded indication signal respectively carrying a number of one of said terminal telephone lines through which said participant is communicating from each of said participant telephone sets, and a respective information, and said display means in said console displays an identification of said one of said terminal telephone lines and said respective information in response to said encoded indication signal retransmitted by said control circuit in said terminal.

12. The telemeeting system according to claim 11, wherein said displaying means comprises three indicator lights which are associated to each of said terminal telephone lines and which are respectively lighted in response to a command signal commanding an inaccessibility of said terminal via each of said terminal telephone lines, a signalling signal indicating the seizing of each of said terminal telephone lines by each of said participant telephone sets, and a command signal commanding a broadcasting of voice signals at least from each of said participant telephone sets serviced by each of said terminal telephone lines to the other telephone sets, and said encoded indication signal retransmitted by said control circuit resulting from said information transmission request triggers in said display means the flashing of at least one of said indicator lights associated with each of said terminal telephone lines through which said participant is communicating and of one of other indicator lights in said display means corresponding to said respective information.

13. The telemeeting system according to claim 11, wherein said organizer telephone set transmits a predetermined command signal subsequent to the displaying of said respective information coming from each of said participant telephone sets whereby said control circuit in said terminal controls the transmission of a tone signal from said communication setting-up and-cutting off means assigned to said participant towards each of said participant telephone sets.

14. The telemeeting system according to claim 1, wherein said console further comprises:

multifrequency-code transmitting means connected between said subscriber telephone line servicing said organizer telephone set and said controlling means for transmitting first and second sequences each preceded by a console identification sequence to said terminal, means connected to said controlling means for dialling said first and second sequences to be transmitted to said terminal, and means connected to said controlling means for visualizing information relating to said first sequences, and information carried by telemeeting parameter sequences transmitted from said control circuit and encoded by said multifrequency-code transmitter in said terminal responsive to said second sequences.

15. The telemeeting system according to claim 14, wherein said first sequences relate to participant call number lists and time intervals respectively associated with telemeetings whereby said control circuit memorized each of said call number lists and the respective time interval and automatically dials, through said communication setting-up and cutting-off means, the call numbers of said list at the beginning of said respective time interval.

16. The telemeeting system according to claim 14, wherein said telemeeting parameter sequences relate to parameters of telemeetings to be established by said terminal and parameters of a telemeeting established by said terminal.

* * * * *